May 2, 1961  H. KORDES  2,982,536

SPRING

Filed Nov. 27, 1957

INVENTOR:
Heinrich Kordes

By Clell W. Zipehurch
ATTORNEY.

United States Patent Office 2,982,536
Patented May 2, 1961

2,982,536
SPRING

Heinrich Kordes, Osnabruck, Germany, assignor, by mesne assignments, to Mobay Chemical Company, Pittsburgh, Pa., a corporation of Delaware Filed Nov. 27, 1957, Ser. No. 699,288

Claims priority, application Germany Nov. 30, 1956

6 Claims. (Cl. 267—1)

This invention relates generally to springs and, more particularly, to resilient elements adapted to compress as a load is applied thereto through lateral expansion of a resilient rubber-like member.

It has been proposed heretofore to fabricate spring elements from a combination of a resilient material and metal with rubber usually being used as the resilient material. Such springs may be fabricated by assembling alternate layers of rubber and metal, one on top of the other, to form a stack. The various elements making up the stack of alternate rubber and metal discs have their entire opposing surfaces joined together in some manner and, consequently, compression of the spring element under a load is achieved only through the resiliency of the rubber. One method of securing the metal part to the rubber is to vulcanize the rubber on the metal which prevents cold flow of the rubber in the resulting product. In accordance with another method, pieces of metal are embedded or completely enclosed in the rubber to reinforce it. It is sometimes the practice to position the stacked pieces of rubber with respect to each other by inserting a pin in a centrally located hole in the rubber. The spring is usually built for a specific load by varying the number of rubber/metal units making up the stack. These type springs have the disadvantage of relying solely upon the resiliency of the rubber for compression and have a relatively short life because of the age hardening characteristics of the rubber.

It is therefore an object of this invention to provide a novel spring element adapted to compress under static pressure. Another object of the invention is to provide an improved spring containing a resilient material. Still another object of the invention is to provide a spring element which can be adjusted for a specific load by predetermining the number of discs of resilient material to be used. A still further object is to provide a spring having a resilient material which is not subject to undesirable cold flow and age hardening.

Other objects will become apparent from the following description with reference to the accompanying drawing, in which.

Figure 1:
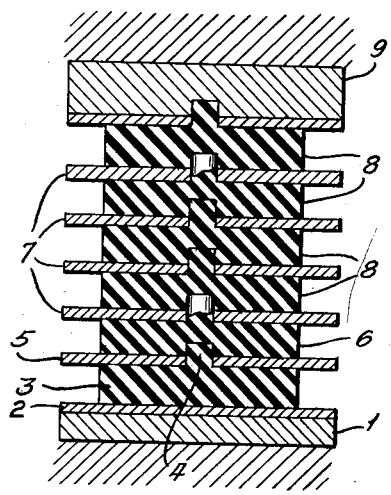
Figure 1 is a longitudinal sectional view of an embodiment of the invention.

Generally speaking, the foregoing objects and others are accomplished in accordance with this invention by providing a spring element having a series of alternate metal and substantially non-porous rubber-like polyurethane layers stacked one on the other and confined against disassembly between a carrier member at each end thereof. More specifically, the invention contemplates a novel resilient spring element adapted to compress under static pressure through the resiliency of a solid substantially non-porous rubber-like polyurethane plastic associated with metal discs or layers. The spring contemplated by this invention may contain a plurality of layers of a solid substantially non-porous rubber-like polyurethane plastic stacked one on the other with an intervening metal layer. The various layers in the stack may be positioned together against disassembly when pressure is applied but the polyurethane layers should be free to move with respect to the adjacent metal layers as they expand laterally. In other words, the polyurethane layers may be joined in a centrally located position to the adjacent metal layer, but the opposing surfaces of the metal layer and polyurethane layer are not vulcanized or adhesively bound together. The polyurethane layer can move with respect to the metal layer as it expands laterally under an applied load. The size of the spring and the number and dimensions of layers of polyurethane and metal may be predetermined for each specific load and it is preferred to always place a layer of metal against the two covers or carrier elements.

Various types of centering and joining devices are contemplated for positioning the polyurethane layer with respect to the adjacent metal layer. In one embodiment of the invention, the polyurethane layer is provided with a centrally located protuberance which extends through a centrally located hole in the adjacent metal layer into a centrally located depression or hole in the bottom of the next polyurethane layer, thereby simultaneously locking the two polyurethane members together, and securing the intermediate metal layer in place.

In another embodiment of the invention, both the polyurethane layers and the intermediate metal layers are provided with centrally located bores extending therethrough. A pin may then be placed in the bores, locking the two against relative movement except that movement which results from compression of the polyurethane layer.

In still another embodiment of the invention, it is not necessary to provide a center guiding means. In this embodiment, the layers of polyurethane and rubber making up the stack are placed in a suitable container having a fixed bottom and an open top through which a movable carrier may enter the container as a load is applied to the carrier. The polyurethane layers will expand under compression until they reach the side walls of the container. The amount of compression of the spring may be controlled by predetermining the relative diameter of the polyurethane layers and container. In a preferred form of this embodiment, alternate polyurethane layers may be of different diameter so that only every other one will expand to the walls of the container under the applied load. It is, of course, possible to interchange the various members making up these embodiments and not only to position them with respect to a centrally located guiding means, but also to vary their diameter and limit their expansion by means of a container. One particular advantage of providing a spring having a container and alternate layers of polyurethane with alternate layers of polyurethane having different diameters, is that from the moment the wall of the container is touched by the larger polyurethane layers, the spring characteristic is changed in such a way that the slope of a curve showing the compression under a given load is suddenly increased. Such a spring will show a constant slope under an applied load up to the point where those polyurethane layers having the greater diameter touch the wall of the container; and then with further increase in the load, the spring becomes harder and the rate of travel is decreased.

All of the various embodiments of the invention have the advantage which permits movement of the layers of polyurethane with respect to the intermediate metal layers which results in friction between the polyurethane surface and the intermediate metal disc. This results in a substantially higher potential energy absorption than can be achieved through use of rubber vulcanized or otherwise secured to metal for making the parts of the stack.

Any suitable solid substantially non-porous rubber-like polyurethane may be used for making the disc or other resilient layers of the spring. However, in order to function satisfactorily, the polyurethane should have a resiliency of from at least about 30% to about 60%. The Shore A hardness of the polyurethane should be from about 50° to about 95°.

The polyurethane plastic may be prepared by reacting any suitable organic polyisocyanate with any suitable organic compound having at least two reactive hydrogen atoms and a molecular weight of at least about 750 and an organic cross-linking agent. Examples of methods for making suitable polyurethane plastics are found in U.S. Patents 2,620,516, 2,621,166, 2,729,618 and 2,764,565. Any of the various chemicals disclosed in these references and any of the methods for making rubber-like substantially non-porous polyurethanes disclosed therein may be used in preparing the rubber-like polyurethane from which the discs of this invention are made. For example, the polyurethane layer may be prepared by reacting an organic diisocyanate, such as, for example, 1,5-naphthylene diisocyanate, p-phenylene diisocyanate, 4,4'-diphenyl dimethyl methane diisocyanate, or the like, with a polyester prepared by esterification of a dicarboxylic acid, such as, for example, adipic acid, succinic acid, or the like, or a polyalkylene ether glycol prepared by thermal condensation of an alkylene oxide, such as, for example, ethylene oxide or propylene oxide, butylene oxide or the like. The cross-linking agent may be any of those disclosed in the aforesaid patents, such as, for example, an organic diamine, a polyhydric alcohol, such as ethylene glycol, diethylene glycol, butane diol or the like.

The polyurethane discs may be formed by casting the polyurethane in a suitable mold by a process like that disclosed in the aforesaid patents or they may be cut from a larger piece of cured polyurethane. Any suitable metal may be used for making the discs, such as, for example, iron, steel, bronze, brass or the like.

Referring now to the drawing for a detailed description of embodiments of the invention, Figure 1 illustrates one embodiment in a longitudinal sectional view with alternate layers confined between two carrier elements 1 and 9. In this embodiment, metal discs 7 are larger in diameter but thinner than substantially non-porous rubber-like polyurethane discs 8. Carrier or cover 1 is at the bottom end of the spring and carrier or cover 9 is at the top end. Metal disc 2 may be adhesively bound to polyurethane disc 3 by means of a suitable isocyanate base adhesive, any other suitable adhesive or by any other means. Polyurethane disc 3, as well as the polyurethane discs 6 and 8, are provided with a centrally located protuberance 4. Metal discs 5 and 7 have a centrally located perforation through which protuberance 4 extends into a hole or depression in the base of polyurethane disc 6 or other polyurethane disc immediately thereabove. Protuberance 4 fits snugly in the hole in the base of polyurethane disc 6 and provides a male and female joint with intermediate metal disc 5 positioned between discs 3 and 6. By this arrangement, the metal discs and polyurethane discs cannot become disassembled during compression, but the facing surfaces of discs 3 and 5 may move as the disc 3 expands under an applied load and the resulting friction between these two surfaces results in higher energy absorption.

Figure 2:
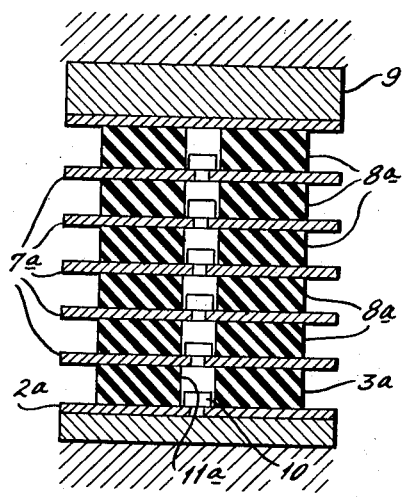
Figure 2 is a longitudinal sectional view of another embodiment of the invention showing one variation in the method of positioning the resilient members with respect to the adjacent metal member.

In the embodiment of Figure 2, alternate metal discs 7a and polyurethane discs 8a form a stack between carriers or covers 1 and 9. The metal disc 2a lies against carrier 1 and has a small centrally located opening which cooperates with a larger centrally located opening 11a in polyurethane disc 3a. A pin 10 fits snugly in the opening in disc 2a and positions polyurethane disc 3a with respect to metal disc 2a. The polyurethane disc 8a and metal disc 7a are joined together centrally by a similar arrangement but the opposing surfaces of the discs are not adhesively or otherwise bound together.

Figure 3:
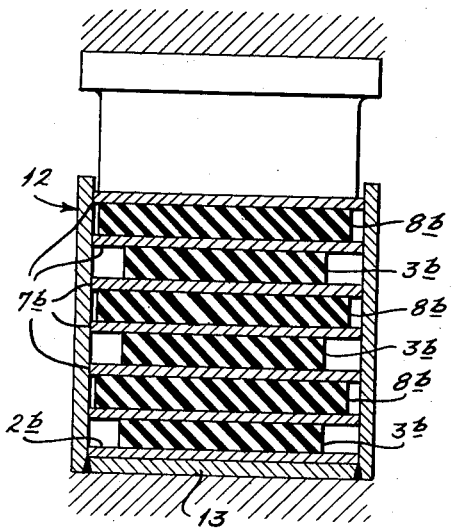
Figure 3 is an illustration of another embodiment of the invention in an uncompressed state.
Figure 4:
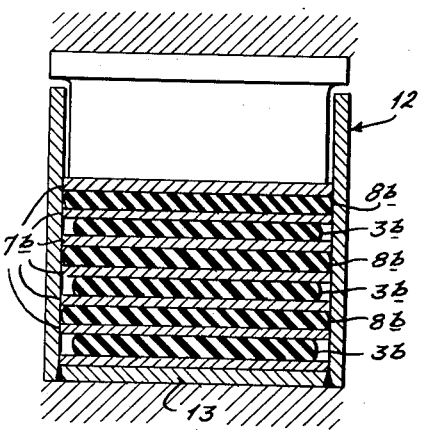
Figure 4 illustrates the position of the resilient members of the embodiment of Figure 3 with respect to the adjacent metal members while under static pressure.

The embodiment of Figures 3 and 4 is made up of a container 12 having side walls and a fixed bottom 13. This container may be made from a tube having a disc secured in place at one end to form the bottom 13. Metal disc 2b lies adjacent bottom 13 and polyurethane disc 3b is stacked thereon. Alternate layers of metal discs 7b and polyurethane disc 8b are then stacked in the container. A plunger-type carrier element adapted to enter the container when a load is applied thereon lies adjacent the top metal disc 7b. As illustrated in the drawing, alternate disc 8b may be larger in diameter than disc 3b. When the spring is compressed, as shown in Figure 4, lateral expansion of disc 8b is stopped when the discs have reached a diameter equal to the internal diameter of container 12. The spring characteristics are changed when discs 8b have reached the inside diameter of container 12 and the constant slope is suddenly increased and the spring becomes harder and more resistant to further pressure as the load is increased. The rate of travel of the carrier is decreased with a given load.

The following is an example of one method of preparing a polyurethane suitable for use in fabricating the resilient discs of the spring:

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 300 parts by weight of naphthylene-1,5-diisocyanate are added at 135° C. to the dehydrated polyester while stirring. As soon as the temperature starts to drop, 70 parts by weight of butylene glycol-1,4 are stirred into the mixture at about 135° C. The resulting mixture is poured into a mold and maintained therein at a temperature of about 110° C. for about 24 hours to form a homogeneous polyurethane rubber. After 24 hours the disc is removed from the heating chamber and the material then shows the following properties: The Shore A hardness 90°, resiliency 35%.

It is to be understood that any other suitable organic polyisocyanate and organic compound having at least two reactive hydrogen atoms capable of reacting with the polyisocyanate to form a polyurethane and any other cross-linking agent may be substituted for those in the foregoing example. It is only necessary that the polyurethane have the physical characteristics set forth hereinbefore.

It may be desirable in some instances to embed particles of molybdenum disulfide in the polyurethane plastic during its preparation. The resulting product will be more abrasion resistant than a similar polyurethane without molybdenum disulfide. The molybdenum disulfide may be incorporated in the polyurethane by mixing it with one of the components reacted together to form the polyurethane or by mixing it with the reaction mixture before solidification of the polyurethane. Preferably, from about 0.01% to about 5% by weight molybdenum disulfide should be incorporated in the polyurethane. Preferably, the particle size of the molybdenum disulfide should be within the range of from about 0.002 millimeter to about 2 millimeters in diameter.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A spring element comprising a container having a bottom and sidewalls and in the container a stack of alternate blocks of substantially non-porous rubber-like polyurethane plastic having a resiliency of from about 30 percent to about 60 percent and a Shore A hardness of from about 50° to about 90° and metal plates which separate and frictionally engage the adjacent surfaces of said blocks, said plates having a diameter substantially equal to the internal diameter of the container thereby preventing contact between opposing surfaces of said blocks under all conditions of load, alternate blocks having a diameter only slightly less than that of the plates and greater than the diameter of the remainder of the blocks when in an uncompressed state, the surfaces of said blocks which contact said plates being free to move and rub against said plates as a load is applied to said spring element and said blocks are compressed, means for preventing separation of said blocks from said plates, means at one end of said stack comprising a piston for transferring an applied load thereto, and means at the other end of said stack for supporting the stack against longitudinal movement as the load is applied.

2. A spring element comprising a container having a bottom and sidewalls and in the container a stack of alternate resilient blocks and metal plates which separate and frictionally engage the adjacent surfaces of said blocks, said plates having a diameter substantially equal to the internal diameter of the container and preventing contact between opposing surfaces of said blocks under all conditions of load, alternate blocks having a diameter less than that of the plates but greater than the diameter of the remainder of the blocks when in an uncompressed state, the surfaces of said blocks which contact said plates being free to move and rub against said plates as a load is applied to said spring element and said blocks are compressed, means for preventing separation of said blocks from said plates, means at one end of said stack comprising a piston for transferring an applied load thereto, and means at the other end of said stack for supporting the stack against longitudinal movement as the load is applied.

3. A spring element comprising a stack of resilient blocks, a single metal plate interposed between adjacent blocks, each block having a centrally located integral protuberance extending from one side of the adjoining plate through a centrally located bore of the said plate into a centrally located cavity in the member on the opposite side of said plate, thereby aligning the blocks and interposed plates of the stack with each other and preventing substantial lateral movement of the blocks while uncompressed, said blocks having a continuous surface on one side extending from said protuberance and a continuous surface on the other side extending from said cavity being free to expand laterally and being movable laterally in frictional engagement with respect to all of the adjacent surfaces of the plates interposed therebetween as the blocks are compressed under a longitudinally applied load, said plates having a diameter greater than the diameter of the blocks, and means for preventing substantial longitudinal movement of the stack as a unit under a longitudinally applied load.

4. A spring element comprising a stack of resilient blocks, a single metal plate interposed between adjacent blocks, a centrally located bore in each block and a centrally located bore in each plate, a plug having one end fitting snugly in the bore of each plate separating adjacent blocks and an opposite end fittingly snugly in the bore of an adjacent block, thereby aligning the blocks and plates and serving as the sole means of joining the plates and blocks together, said blocks having a continuous surface on both sides thereof adjacent said plates and being movable laterally in frictional engagement with all of the adjacent surfaces of said plates as the blocks are compressed by a longitudinal applied load, said plates having a diameter greater than the diameter of the blocks, and means of preventing substantial longitudinal movement of the stack as a unit when said load is applied.

5. The element of claim 4 wherein the blocks are substantially non-porous rubber-like polyurethane plastic having a resiliency of from about 30 percent to about 60 percent and a Shore A hardness of from about 50° to about 90°.

6. The element of claim 3 wherein the blocks are substantially non-porous rubber-like polyurethane plastic having a resiliency of from about 30 percent to about 60 percent and a Shore A hardness of from about 50° to about 90°.

References Cited in the file of this patent

UNITED STATES PATENTS

| 1,911,330 | Symington | May 30, 1933 |
| 2,486,741 | Gabriel | Nov. 1, 1949 |
| 2,553,635 | Dath | May 22, 1951 |
| 2,639,141 | Gabriel | May 19, 1953 |
| 2,693,953 | Munro et al. | Nov. 9, 1954 |
| 2,729,618 | Muller | June 3, 1956 |